Feb. 6, 1934.    J. T. CATLETT    1,946,306

WELDING TORCH

Filed May 3, 1933

Inventor:
James T. Catlett,
by Charles E. Tullar
His Attorney.

Patented Feb. 6, 1934

1,946,306

UNITED STATES PATENT OFFICE 1,946,306

WELDING TORCH

James T. Catlett, Scotia, N. Y., assignor to General Electric Company, a corporation of New York Application May 3, 1933. Serial No. 669,187

9 Claims. (Cl. 219—8)

My invention relates to welding and more particularly to an improved welding torch for gas-arc welding.

In gas-arc welding the welding operation is performed through the agency of an electric arc to and about which a gaseous medium is supplied during the welding operation. One form of gas-arc welding for which my torch is particularly suited is known as atomic hydrogen welding. In atomic hydrogen welding use is made of the heating effects resulting from the recombination of hydrogen which has been dissociated through the agency of some suitable means such as an electric arc.

In my application, Serial No. 534,362, filed May 1, 1931, for welding apparatus, and assigned to the same assignee as the present application, I have disclosed and broadly claimed an arrangement for stabilizing the operation of an arc established between converging electrodes. An arc formed between the adjacent terminals of converging electrodes located in the same plane also tends to stay in the same plane but may waver through an angle approaching 180°. I have found, as pointed out in my above application, that if the electrodes are held in converging positions relative to a line of convergence with their arcing terminals laterally displaced with respect to one another in the direction of said line of convergence that the welding arc assumes a very steady position in which its major portion extends in a crosswise direction to the electrodes. Thus by merely shifting the arcing terminals of the electrodes relative to one another in the direction of their line of convergence the plane of the welding arc may be changed 90° and its stability greatly increased.

It is an object of my invention to provide a welding torch, particularly suitable for use as a hand-torch, in which means are provided for adjusting the lateral displacement of the arcing terminals of converging electrodes.

Figure 1:
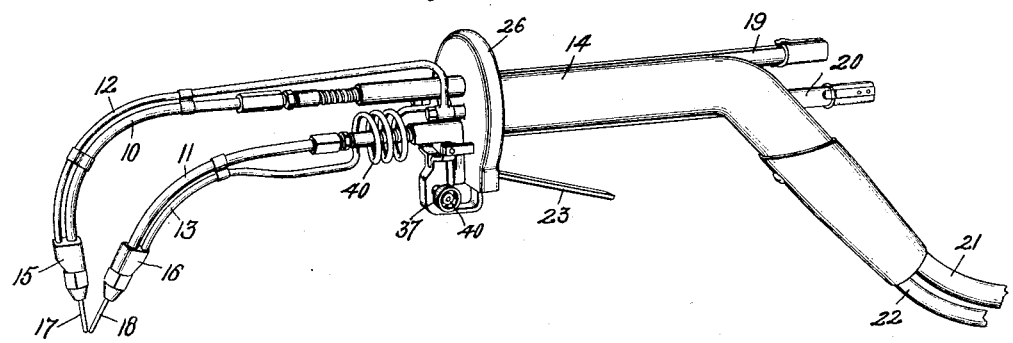
Figure 2:
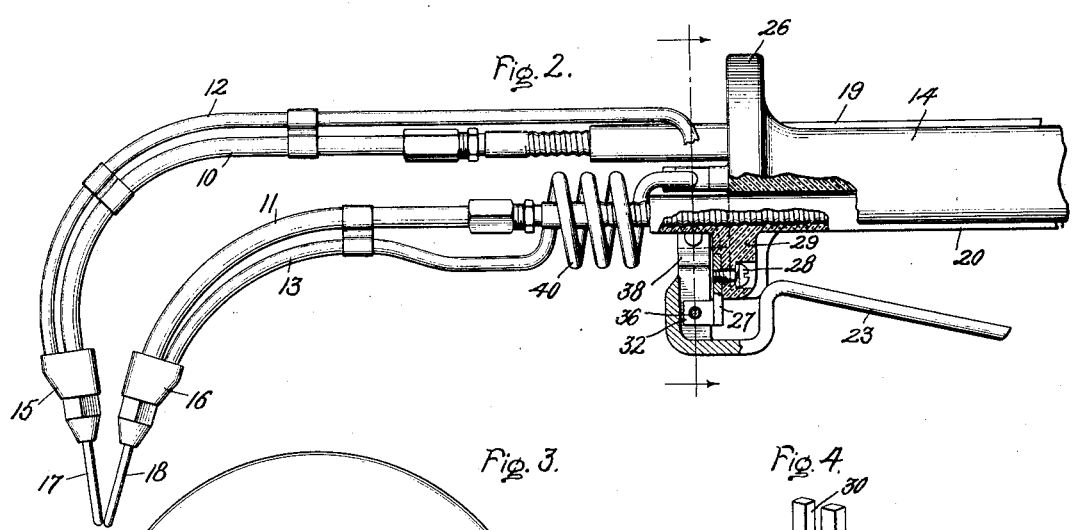
Figure 3:
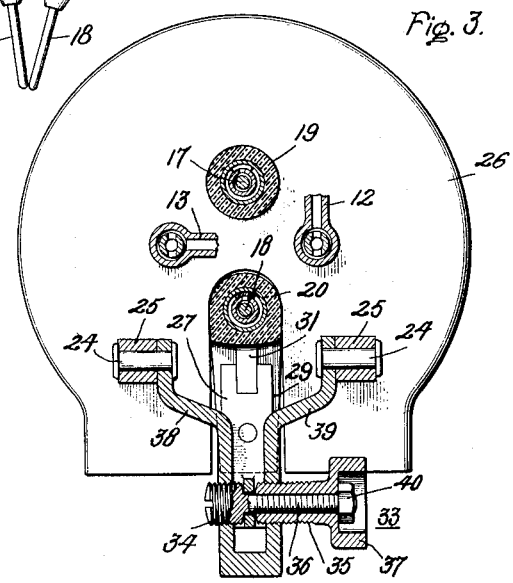
Figure 4:
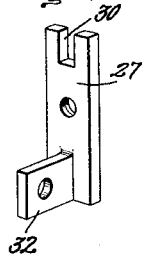

My invention will be better understood from the following description taken in connection with the accompanying drawing in which Fig. 1 is a perspective view of a torch embodying my invention; Fig. 2 is an enlarged view of the torch shown in Fig. 1 with parts broken away and in section to illustrate its construction; Fig. 3 is a sectional view along lines 3—3 of the torch shown in Fig. 2, and Fig. 4 is a perspective view of a part of the torch.

The torch shown in the drawing is of the type illustrated in Patents 1,869,328, Harry W. Tobey, July 26, 1932, and 1,869,341, Harold V. May, July 26, 1932. It comprises a plurality of electrode tubes 10 and 11 and gas tubes 12 and 13 having downwardly and inwardly converging curved portions projecting beyond a handle 14 and terminating in nozzles 15 and 16. The electrode tubes constitute electrode holders through which flexible electrodes 17 and 18 are fed into arcing engagement with one another by means of feeding mechanisms 19 and 20, which are more fully described and claimed in the above referred to patent to Harold V. May. Gas supplied through tubes 12 and 13 is discharged through nozzles 15 and 16 about the arcing terminals of these electrodes. The feeding mechanisms are in the parts of the electrode tubes which are insulated and supported in slots in the handle 14. Electrode tube 10 is immovably supported in its slot while electrode tube 11 is slidably positioned in its slot. Electric current is supplied to the electrode tubes 10 and 11 through a twin conductor 21, the terminals of which are connected to that portion of the gas tubes 10 and 11 located in the handle of the torch. Gas is supplied to these tubes through a conduit 22. The handle is preferably made of a material having good thermal and electrical insulating qualities although any suitable material may be employed.

The electrode tube 11 is translated relatively to electrode tube 10 through the agency of a forked lever 23 which is connected by hinge pins 24 to studs 25 supported on the guard 26 of handle 14. This lever is connected to the electrode tube 11 by an arm 27 which is attached by a screw 28 to a lug 29 forming part of the insulated covering about the end of tube 11 in which the feeding mechanism is located. The arm 27 is slotted at 30 and cooperates with a projection 31 on the lug 29 so that the single screw 28 holds the arm 27 rigidly on the arm 29, and any motion transmitted to the arm 27 will be positively transmitted to the electrode tube 11. The lever 23 is connected to lug 32 of arm 27 by means of an adjusting screw 33 which is supported in the lever. This adjusting screw is formed of two parts 34 and 35 one or both of which are threaded and one of which is provided with a stud 36 which projects through a longitudinal opening in the other. The parts 34 and 35 are assembled with sufficient clearance to permit rotation on lug 32 of arm 27 with their threaded portion or portions in engagement with the threads in straps 38 and 39 of the lever 23. They are held in assembled relation by means of a nut 40 on stud 36 of part 34 which also engages a shoulder on part 35. By reason of the construction of the adjusting screw it is possible to assemble it with the operating knob 37 on either the right or left-hand side of the lever 23, thus adapting the torch for both right-hand and left-hand welders.

The electrode tube 11 is biased to a predetermined position in its slot by the spring action of the coiled portion 40 of gas tube 13 one end of which is rigidly supported in the handle of the torch. Movement of this electrode tube longitudinally of the handle is obtained through the operation of lever 23 which is pivotally supported on the handle of the torch for movement in the direction of the slot in which this tube is located. By referring to Fig. 3 it will be noted that the clearance between the electrode tube and the walls of its groove is small enough so that it will pivot for rotation about its axis in the handle when a rotating force is applied thereto through the agency of arm 27 and adjusting screw 33. The projecting lug 29 to which the arm 27 is attached is tapered a slight amount to increase the possible rotary motion.

In the torch illustrated in the drawing the parts are arranged so that normally the electrodes 17 and 18 are held in engagement with one another. The electrodes are separated by movement of the lever 23 toward the handle 14 of the torch which displaces tube 11 along its slot in handle 14. If the electrodes 17 and 18 are located in the same vertical plane, the arc formed between their terminals will also be for the most part in this same vertical plane, although due to its instability it tends to waver through an angle approaching 180°. By rotating the electrode tube 11 about that portion of its axis in the handle of the torch through the agency of adjusting screw 33, the arc may be made to take a position in a plane approximately 90° to that in which the electrodes were located prior to this adjustment.

Although the torch illustrated and described above has a particular utility when used for atomic hydrogen welding, it is not limited to this particular form of gas-arc welding. In fact, my invention is of general application to welding apparatus wherein a welding arc is maintained between a plurality of converging electrodes. Modifications of my invention will occur to those skilled in the art in view of the arrangement above described, and I therefore aim in the appended claims to cover all such modifications as fall within the true spirit and scope of my invention.

What I claim as new and desire to secure by Letters Patent of the United States is:

1. An arc welding torch comprising a plurality of means for holding a plurality of electrodes in converging positions relative to one another, means for rotating one of said holding means about an axis forming an angle with the axis of the electrode supported thereby, and means for translating one of said holding means relatively to another of said holding means in the direction of said axis of rotation.

2. An arc welding torch comprising a support, a plurality of electrode holders having converging terminal portions, at least one of which is curved, said terminal portions projecting from said support, means for displacing one of said holders in said support, and means for rotating a holder having a curved terminal portion about its axis in said support.

3. An arc welding torch comprising a support, a plurality of electrode holders having curved converging terminal portions, means for displacing one of said holders in said support, and means for rotating one of said holders about its axis in said support.

4. An arc welding torch comprising a handle, a plurality of electrode tubes having converging curved portions projecting beyond said handle, means for displacing one of said tubes longitudinally of said handle, and means for rotating said tube in said handle.

5. An arc welding torch comprising a handle, a plurality of electrode tubes having converging curved portions projecting beyond said handle, a longitudinal groove in said handle, means for supporting one of said tubes in said groove, means for displacing said tube along said groove, and means for rotating said tube in said groove.

6. An arc welding torch comprising a handle, an electrode tube supported by and extending beyond said handle, a longitudinal groove in said handle, means for supporting in said groove a second electrode tube having a curved terminal portion extending beyond said handle and inclined to the terminal portion of said first-mentioned tube, means for displacing said second tube in said groove, and means for rotating said second tube in said groove.

7. An arc welding torch comprising a handle, an electrode tube supported by and extending beyond said handle, a longitudinal groove in said handle, means for supporting in said groove a second electrode tube having a curved terminal portion extending beyond said handle and inclined to the terminal portion of said first-mentioned tube, a lever, means for pivotally supporting said lever, means for connecting said lever to said second tube, and means on said lever for rotating said second tube in said groove.

8. An arc welding torch comprising a handle, an electrode tube supported by and extending beyond said handle, a longitudinal groove in said handle, means for supporting in said groove a second electrode tube having a curved terminal portion extending beyond said handle and inclined to the terminal portion of said first-mentioned tube, a lever, means for pivotally supporting said lever on the end of said handle for movement in the direction of said groove, an arm attached to said second tube and connected to said lever, and means for adjusting said arm transversely to said lever.

9. An arc welding torch comprising a support, a plurality of electrode tubes having converging terminal portions, at least one of which is curved, projecting from said support, nozzles at the converging ends of each of said tubes, means for feeding electrodes through said tubes and said nozzles, means for connecting a source of electricity to each of said nozzles, means for discharging gas through each of said nozzles about said electrodes, means for biasing said tubes relatively to one another to a predetermined position, means for displacing one of said tubes in said support, and means for rotating a tube having a curved terminal portion about its axis in said support.

JAMES T. CATLETT.